G. D. ALEXANDER.
POWER WRENCH.
APPLICATION FILED MAR. 22, 1919.
1,322,391.
Patented Nov. 18, 1919.
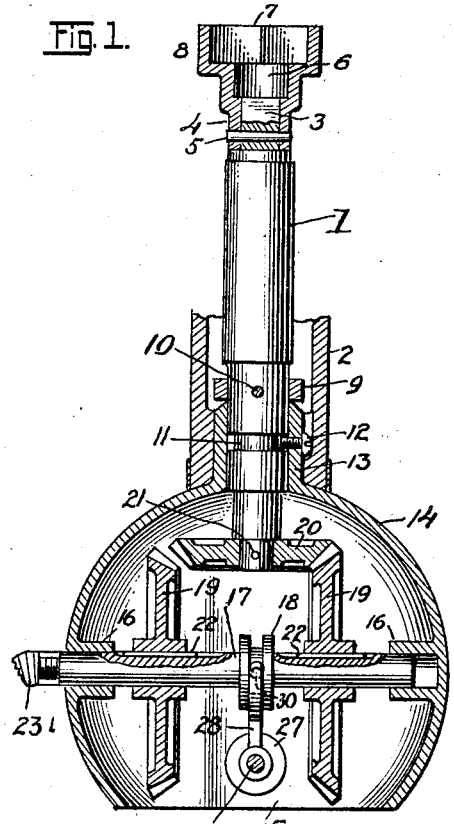
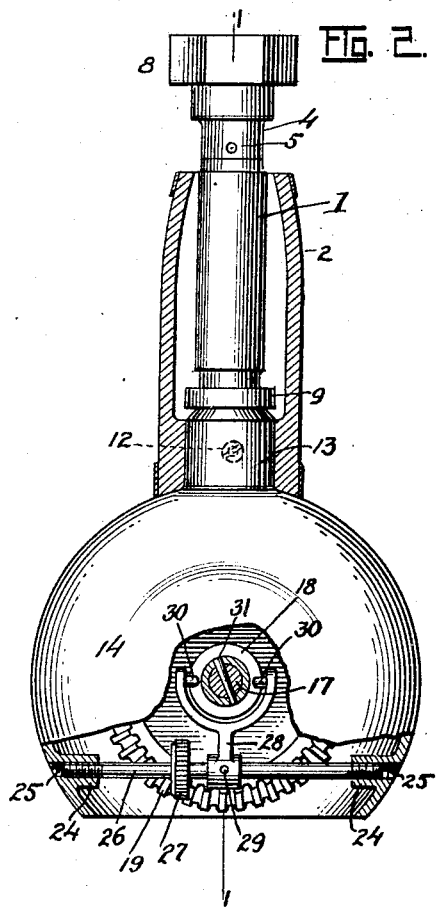
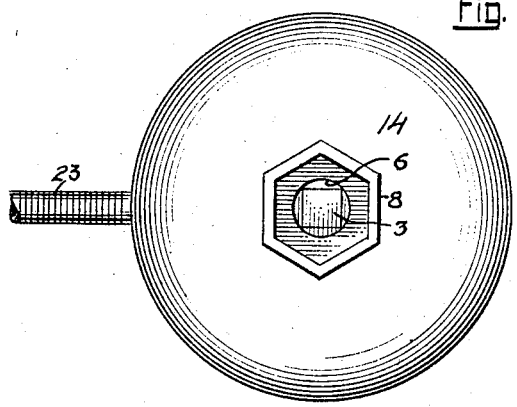
Inventor
George Dewey Alexander
By his Attorney
Edward S. Beach

UNITED STATES PATENT OFFICE.

GEORGE DEWEY ALEXANDER, OF NEW YORK, N. Y., ASSIGNOR OF ONE-HALF TO CLARENCE R. SAUNDERS, OF CLEVELAND, OHIO.

POWER-WRENCH.

1,322,391.   Specification of Letters Patent.   Patented Nov. 18, 1919.

Application filed March 22, 1919. Serial No. 284,416.

*To all whom it may concern:*

Be it known that I, GEORGE DEWEY ALEXANDER, a citizen of the United States, residing in the city, county, and State of New York, have invented certain new and useful Improvements in Power-Wrenches, of which the following is a specification.

This invention relates to power wrenches for putting on and removing bolt nuts. The object of the invention is to produce an efficient and simple power wrench appropriate for hand use and the length of which may be as desired. My new wrench is particularly useful in work under automobiles and in garages. It is of general utility.

In the accompanying drawings forming a part hereof and illustrating my invention, Figure 1 is a lengthwise sectional elevation at line 1—1 of Fig. 2, the hand grip being omitted.

Fig. 2 is a side elevation, with the hand grip shown in lengthwise section, and a part of the casing broken away for greater clearness, the power shaft and its shifting collar hub being shown in cross section. Fig 2 also shows means for shifting the power shaft endwise to reverse the direction of rotation of the power-driven spindle which carries the nut-engaging socket.

Fig. 3 is a top plan view of the wrench.

In that form of the invention now shown, 1 is a spindle which for a portion of its length is incased by a lengthwise-extending tubular hand grip 2 within which the spindle is free to rotate. The upper end 3 of the spindle is preferably made polygonal in cross-section for reception of the lengthwise-chambered shank 4 that is peripherally interiorly polygonal for a sliding fit of the nut-engaging socket the shank of which is indicated by 4. Shank 4 is detachably fixed on the spindle by a tapered pin 5. Above the outward end of the spindle thus seated in the chamber of the shank 4 the intermediate portion of the socket has a space 6 for reception of the end of a bolt that may project through a nut either when a nut is to be put on or taken off from the bolt. The nut-receiving portion 7 of the socket is interiorly polygonal and the socket is generally indicated by 8. Various sizes of nut-engaging sockets may be attached to and detached from the spindle as required. Well below the socket 8 the spindle carries a collar 9 shown pinned to it at 10 and below the collar the spindle is formed with a peripheral groove 11 for reception of a pin or screw 12 into the collar, this pin or screw together with the collar keeping the spindle in endwise assemblage with the tubular bearing neck 13 of casing 14 through which the spindle passes from within the chamber of the casing outwardly to the nut-engaging socket. The pin or screw 12 passes through a wall of the neck bearing 13 and the collar 9 fixed to the spindle bears on the outer end of such neck bearing. The casing is shown as a segment of a sphere having a bottom opening 15 opposed to the tubular neck-bearing 13. The opening 15 is to permit assemblage of members contained within the chamber of the casing and all of which are preferably located within the chamber. The bottom of the casing is cut off flat so that the wrench can be stood upright on a floor or otherwise. The chamber of the casing is provided with interiorly projecting transversely alined tubular bearings 16 in which the opposite end portions of a transverse revoluble power shaft 17 are journaled. Between its ends the power shaft is provided with a thereon fixed grooved shifting collar 18 and at each side of this collar the power shaft is provided with a beveled gear 19 one of which, according to the endwise adjustment of the shaft, is adapted to mesh with a beveled gear 20 shown fixed at 21 to the inner end of the spindle 1 within the chamber of the casing and at its upper portion. When one of the beveled gears 19 is thus in mesh with the beveled gear 20, the other beveled gear 19 is out of mesh with the beveled gear 20, and the beveled gear 20 and spindle 1 will be rotated in a given direction. When, however, the other beveled gear 19 that has been out of mesh with the beveled gear 20 is brought into mesh with the beveled gear 20 and the other beveled gear 19 is carried out of mesh with the beveled gear 20, the latter and the spindle will be rotated in the reverse direction. The power shaft 18 is therefore made endwise slidable and is mounted at right angles to the axis of the spindle 1 with the beveled gears 19 and 19 in position to mesh with the beveled gear 20 at diametrically opposite portions of the latter. One end of the power shaft 17 projects outwardly of the casing and is shown provided with a flexible shaft 23 which may come from any appropriate source of power located at any workable distance from the place at which the wrench is manually used. Of course the power shaft 17 may be driven by any appropriate means other than the flexible shaft, but for work under an automobile in garages the flexible shaft is obviously the proper means for enabling the hand wrench to be conveniently used at various places under the automobile, and the same consideration would apply to various other uses of this hand power-driven wrench. The casing 14 is also provided with interiorly projecting diametrically-oppositely-disposed tubular bearings 24 at right-angles to the bearings 16 and at a lower level than such bearings. The bearings 24 are interiorly threaded at 25 for reception of the threaded ends of a transverse rockable spindle 26 which at each end is screw-threadedly journaled in the bearings 24 as described. Between its ends this spindle 26 is provided with a thereon fixed knurled adjusting nut 27 adjacent which a forked shifting lever 28 is pinned to the spindle at 29, each fork arm being provided with an inwardly projecting pin 30 which projects into the groove of the shifting collar 18, thus permitting free rotation of the power shaft at all times. The power shaft and shifting collar 18 are shown secured together by a pin 31. When it is desired to shift one of the beveled gears 19 into mesh with a beveled gear 20 on the spindle and the other beveled gear 19 out of mesh with the beveled gear 20 for reversing the direction of rotation of the spindle 1, all that it is necessary to do is to give a slight rocking movement to the spindle 26 by thumb pressure on the knurled nut 27.

Advantages of my invention are: lightness of weight and compactness of construction; a construction of the casing by means of which all the driving parts are readily assemblable within the chamber of the casing; freedom from exterior projections except where power is applied to the power shaft; the flattening of the bottom of the casing whereby it can be stood upright like a candlestick; and the construction by which the lower end of the hand grip 2 may be forced tightly on the tubular neck-bearing wall 13 as shown in Fig. 2. By making the device without any exterior moving projections other than stated, the wrench can be manually used without danger.

It will be observed that the two beveled gears 19 on the power shaft are thereon fixed and spaced apart by a distance greater than the diameter of the beveled gear 20 on the spindle carrying the nut-engaging socket, so that only one of the beveled gears on the power shaft will be in mesh with the beveled gear on said spindle at any one time.

What I claim is:

1. The combination in a portable hand wrench of a revoluble spindle having at one end a nut-engaging socket and being journaled at its other end in the tubular bearing neck of an enlarged chambered casing into the chamber of which the spindle projects and is therein provided with a beveled gear; within said chamber of the casing a transverse endwise-slidable power shaft provided with a pair of beveled gears fixed to the power shaft; shifting means carried by the casing and operatively connected with the power shaft; the beveled gears on the power shaft being spaced apart by a distance greater than the diameter of the beveled gear on the spindle; a hand grip secured to the casing, extending lengthwise of the spindle and within which the spindle is revoluble; and an end of the power shaft projecting through the casing for connection with a source of power; the power shaft being opposed to and spaced apart from the bevel gear on said spindle, and the wall of said chamber having opposed bearings in which end portions of the power shaft are journaled; and means to restrain endwise movements of the spindle.

2. In the combination stated in claim 1, the shifting means carried by the casing comprising a transverse rockable spindle at right-angles to the power shaft; a forked shifting lever carried by such rockable spindle; a grooved shifting collar carried by the power shaft; a thumb nut fixed on the rockable spindle; and for the ends of the rockable spindle interiorly-projecting bearings carried by the casing, an end of the rockable spindle having a threaded connection with one of the bearings.

3. In the combination stated in claim 1, the bottom of the casing being provided with a flat-wall opening whereby driving members may be located in the casing and the casing may stand upright on its bottom end.

In testimony whereof I have hereunto set my hand this 21st day of March, 1919.

GEORGE DEWEY ALEXANDER.